US008325603B2

(12) United States Patent
Bian et al.

(10) Patent No.: US 8,325,603 B2
(45) Date of Patent: Dec. 4, 2012

(54) METHOD AND APPARATUS FOR DEQUEUING DATA

(75) Inventors: Yunfeng Bian, Shenzhen (CN); Haiyan Luo, Shenzhen (CN); Bai Cheng, Shenzhen (CN); Youjie Duan, Shenzhen (CN); Hui Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 12/829,165

(22) Filed: Jul. 1, 2010

(65) Prior Publication Data

US 2011/0002345 A1  Jan. 6, 2011

(30) Foreign Application Priority Data

Jul. 1, 2009  (CN) .......................... 2009 1 0088075

(51) Int. Cl.
*H04L 12/26* (2006.01)
(52) U.S. Cl. ..................................... 370/230

(58) Field of Classification Search ........................ None
See application file for complete search history.

(56) References Cited

U.S. PATENT DOCUMENTS 8,036,117 B1 * 10/2011 Sindhu et al. ................. 370/230
8,078,763 B1 * 12/2011 Boddu et al. ................. 709/249

FOREIGN PATENT DOCUMENTS

CN       1411211 A       4/2003

OTHER PUBLICATIONS

Translation of Office Action dated Nov. 22, 2010 in connection with Chinese Patent Application No. 200910088075.9.

* cited by examiner

*Primary Examiner* — Raj Jain (57) ABSTRACT

A method and apparatus for dequeuing data are disclosed. The method includes: obtaining storage addresses of packets in each queue, and dequeuing, by multiple dequeue processing engines, the packets in each queue in parallel according to the storage addresses of the packets in each queue. Multiple dequeue processing engines dequeue the packets in multiple queues in parallel, and thus the data dequeue efficiency and performance are improved.

15 Claims, 4 Drawing Sheets

METHOD AND APPARATUS FOR DEQUEUING DATA

CROSS-REFERENCE TO RELATED APPLICATION

This application claims priority to Chinese Patent Application No. 200910088075.9, filed on Jul. 1, 2009, which is hereby incorporated by reference in its entirety.

TECHNICAL FIELD

The present invention relates to the field of communications technology, and in particular, to a data dequeuing technology.

BACKGROUND

In a communications chip, a lot of queues usually need to be processed. The queue data is generally stored in an independent off-chip memory and managed in the form of a linked list data structure. The linked list control information may be independently stored in a synchronous static random access memory (SSRAM) that can be accessed at a high speed. The queue data may be stored in a large-capacity synchronous dynamic random access memory (SDRAM) where parallel operations are allowed.

The structure of the queue data is managed by using the header/tail pointer as the main information. The process of dequeuing the data may include the following steps:

(1) Receiving a dequeue command indicating that one or more packets are dequeued. The total amount of dequeue data is equal to "credit" bytes.

(2) Reading a linked list unit pointed to by the "header", and updating the "header" with the next linked list unit address "nxt_pd_ptr" in the read linked list unit.

(3) Subtracting the data length of the "info" in the read linked list unit from the "credit" bytes. If the remaining amount of bytes "credit" is greater than 0, data that needs to be dequeued still exists. Then, repeat step (2) until the remaining amount of bytes "credit" is smaller than or equal to 0, so as to finish dequeuing.

During the implementation of the present invention, the inventor discovers at least the following problems in the prior art:

In the preceding process, the data corresponding to the node of the next linked list unit can start to be dequeued only after a next pointer of the linked list unit pointed to by the queue header is read. The dependence in operation from the front to the back restricts the dequeue performance and reduces the dequeue efficiency.

SUMMARY

Embodiments of the present invention provide a method and apparatus for dequeuing data to improve the dequeue efficiency and data dequeue performance.

A method for dequeuing data includes:
obtaining storage addresses of packets in each queue; and
dequeuing, by multiple dequeue processing engines, the packets in each queue in parallel according to the storage addresses of the packets in each queue.

An apparatus for dequeuing data includes:
an information obtaining unit, configured to obtain storage addresses of packets in each queue; and
a multi-engine dequeue operating unit, configured to dequeue the packets in each queue by multiple dequeue processing engines according to the storage addresses of the packets in each queue obtained by the information obtaining unit.

According to the technical solution provided in embodiments of the present invention, multiple dequeue processing engines dequeue the packets in multiple queues in parallel, and thus the data dequeue efficiency and performance are improved.

BRIEF DESCRIPTION OF THE DRAWINGS

To make the technical solution under the embodiments of the present invention clearer, the accompanying drawings for illustrating the embodiments of the present invention are outlined below. Evidently, the accompanying drawings are exemplary only, and those skilled in the art can derive other drawings from such accompanying drawings without creative work.

DETAILED DESCRIPTION

The technical solution of the present invention is hereinafter described in detail with reference to the accompanying drawings. It is evident that the embodiments are only exemplary embodiments of the present invention and the present invention is not limited to such embodiments. Those skilled in the art can derive other embodiments from the embodiments given herein without creative work, and all such embodiments are covered in the scope of protection of the present invention.

In embodiments of the present invention, after a dequeue command is received, the storage addresses of packets in each queue may be obtained; multiple dequeue processing engines dequeue the packets in each queue in parallel. Each related dequeue processing engine may dequeue the packets independently. That is, multiple dequeue processing engines may dequeue multiple packets concurrently. The storage address of a related packet may be the storage address of the packet header or the storage addresses of the packet header and the packet tail.

Figure 1:
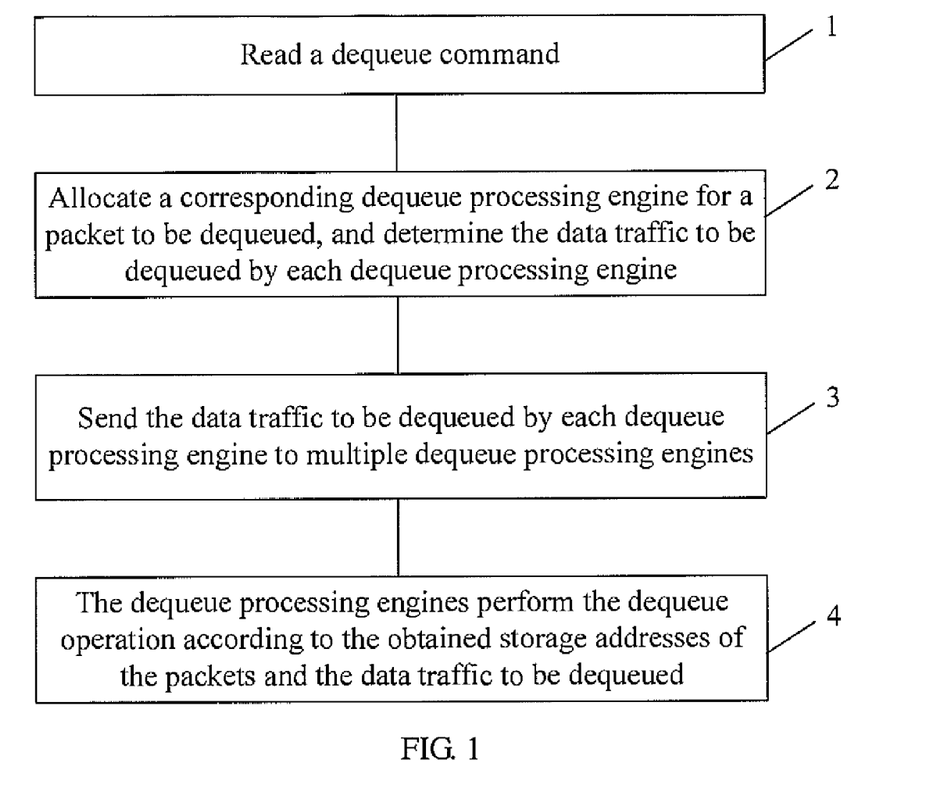
FIG. 1 illustrates a process in an embodiment of the present invention.

Further, to dequeue multiple queues at a high rate, the solution for dequeuing data in embodiments of the present invention may include the following steps, as shown in FIG. 1.

Step 1: Receiving a dequeue command that includes the information about the amount of dequeue data, where the information about the amount of dequeue data indicates the amount of the dequeue data to be dequeued according to the dequeue command.

Step 2: Allocating a corresponding dequeue processing engine for the packet to be dequeued, and determining the amount of the data to be dequeued by each dequeue processing engine.

Specifically, after the dequeue command is received, a dequeue processing engine may be selected from multiple dequeue processing engines for a packet to be dequeued currently; the data amount of the packet allocated to the dequeue processing engine is subtracted from the dequeue data amount obtained from the dequeue command. In addition, the data amount of the packet allocated to the dequeue processing engine may be used as the data amount to be dequeued by the dequeue processing engine related to the packet.

In the preceding process of subtracting the data amount of the packet allocated to the dequeue processing engine from the dequeue data amount obtained from the dequeue command. Further, it is needed to determine whether to continue allocating a dequeue processing engine for other packets that need to be dequeued according to the remainder after the subtracting. The specific processing method includes the following:

(1) If the remainder is greater than zero, it indicates that packets may be dequeued continuously. A corresponding dequeue processing engine is allocated for a next packet that needs to be dequeued until the remainder is smaller than or equal to zero. That is, when the remainder is smaller than or equal to zero, related dequeue processing engines are not allocated for the packet that is not dequeued.

(2) If the remainder is smaller than zero, the absolute value of the remainder is subtracted from the new dequeue data amount carried in a received next dequeue command. The new remainder is used as the updated dequeue data amount in the received next dequeue command. That is, when the remainder is smaller than zero, the new dequeue data amount in a dequeue command received next time needs to be updated to subtract the amount of the data which is dequeued in the previous dequeue operation in advance.

In the process of allocating a related dequeue processing engine for a packet that needs to be dequeued, a dequeue processing engine may be selected among many dequeue processing engines for the packet according to a preset rule. According to the preset rule, a dequeue processing engine may be selected at random, in turn or in any other preset modes.

Step 3: Sending the data amount to be dequeued by each dequeue processing engine to a related dequeue processing engine.

For example, the data amount of a packet that needs to be dequeued may be sent to a dequeue processing engine allocated for the packet as the data amount to be dequeued.

After a dequeue processing engine is allocated for the packet that needs to be dequeued currently, for the head packet in the queue, the data amount to be dequeued by each dequeue processing engine is sent to the dequeue processing engine allocated for the packet. Further, the storage address of the head packet in the queue may be carried in the dequeue command and sent to the dequeue processing engine allocated for the head packet. For packets following the head packet in the queue, the storage addresses of related packets do not need to be carried in the dequeue command and sent to the dequeue processing engines allocated for the packets. In this case, the dequeue processing engines may determine the storage addresses of packets following the head packet through calculating according to the previously obtained storage address of the head packet in the queue. Of course, for the packet which is not the head packet in the queue, the storage addresses of the packets (that is, storage addresses of the packet headers) may also be carried in the dequeue command and sent to the dequeue processing engines allocated for the packets. In this way, the dequeue processing engines may directly obtain the storage addresses of the packets.

Step 4: Multiple dequeue processing engines dequeue the packets in each queue according to the obtained storage addresses of the packets (that is, storage addresses of the packet headers) and the data amount to be dequeued by each dequeue processing engine.

Further, in this step, each dequeue processing engine may perform the dequeue operation starting from the storage addresses of related packets (that is, storage addresses of the packet headers) according to the data amount to be dequeued by each dequeue processing engine. Each dequeue processing engine may stop the dequeue operation until the dequeued data amount reaches the data amount to be dequeued by each dequeue processing engine.

Each dequeue processing engine may obtain the storage address of a related packet through calculation, or by receiving the address information of external packets, or by using other means.

When a dequeue processing engine dequeues packets, it may dequeue the packets in turn according to the addresses of the packets or at random.

In this step, multiple dequeue processing engines dequeue the packets independently and in parallel and thus the dequeue efficiency is improved significantly.

Further, to achieve dequeuing multiple queues at a high rate, the solution for dequeuing data in the embodiment of the present invention may include the following steps:

(1) Receive a dequeue command that includes storage addresses of the packets in each queue that needs to be dequeued.

The storage address of a packet may include the storage address of the packet header and the storage address of the packet tail to determine the header and tail locations of the packet.

(2) Allocating related dequeue processing engines for packets to be dequeued, and sending the storage addresses of the packets in each queue to related dequeue processing engines.

(3) Multiple dequeue processing engines dequeue the packets in each queue according to the obtained storage addresses of the packets.

In the embodiment, after a packet or a queue is dequeued in preceding step 4 or step (3), the dequeue processing engine occupied by the packet or queue may be released so that other packets or queues may occupy the dequeue processing engine during the dequeue operation. For example, when each packet is dequeued, the dequeue processing engine allocated for the same packet may dequeue multiple cells in the packet. That is, the dequeue processing engine related to the packet dequeues multiple cells in the packet first successively. After all the cells in the packet are dequeued, the dequeue processing engine allocated for the packet may be released.

In conclusion, in the embodiment, a set of multi-engine dequeue solution is provided to dequeue multiple packets. Thus, the access bandwidth of the off-chip memory may be effectively used, and the dequeue performance of the system may be improved.

Figure 2A:
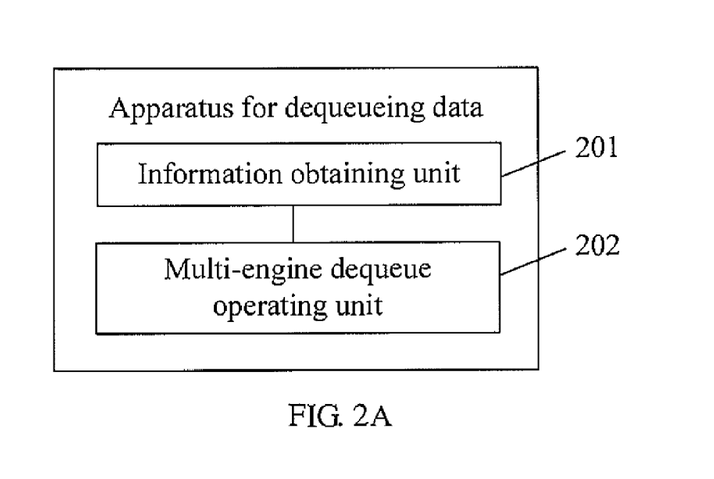
FIG. 2A is a first schematic diagram illustrating a structure of an apparatus in an embodiment of the present invention.
Figure 2B:
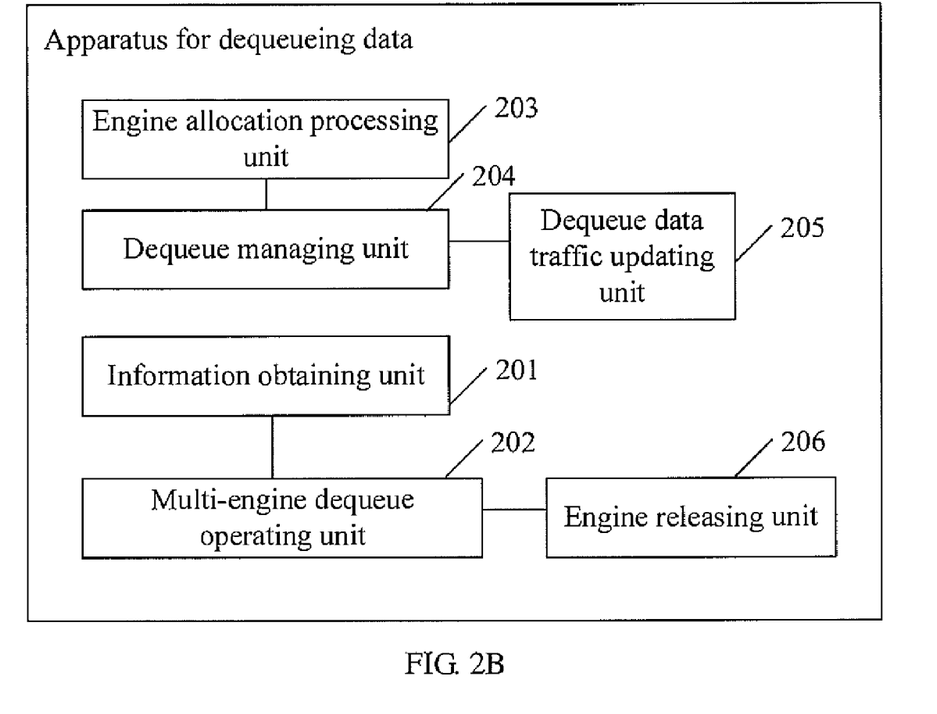
FIG. 2B is a second schematic diagram illustrating a structure of the apparatus in an embodiment of the present invention.

An embodiment of the present invention provides an apparatus for dequeuing data. As shown in FIG. 2A and FIG. 2B, the apparatus includes:

an information obtaining unit 201, configured to obtain the storage addresses of each packet in the queue so that the locations of the packets can be obtained; and a multi-engine dequeue operating unit 202, configured to dequeue the packets in each queue in parallel by multiple dequeue processing engines according to the storage addresses of the packets in each queue obtained by the information obtaining unit 201, where the storage address of the packet may be the storage address of the packet header or the storage addresses of the packet header and the packet tail.

Each dequeue processing engine may dequeue the packets independently so that multiple dequeue processing engines may dequeue multiple packets concurrently. That is, multiple dequeue processing engines dequeue the packets independently and in parallel, and thus the dequeue efficiency is improved.

Further, the apparatus may include an engine allocation processing unit 203 and a dequeue managing unit 204.

The engine allocation processing unit 203 is configured to allocate a related dequeue processing engine for a packet that needs to be dequeued currently so that the multi-engine dequeue operating unit 202 may dequeue each packet in parallel through the dequeue processing engine allocated for each packet. The engine allocation processing unit 203 is further configured to: send the storage address of the packet obtained from the received dequeue command to the dequeue processing engine allocated for the packet so that the information obtaining unit 201 may obtain the storage address of the packet, or send the data amount of the packet to the dequeue processing engine as the data amount to be dequeued, so as to dequeue the packet through the dequeue processing engine.

In the process of allocating a related dequeue processing engine for a packet that needs to be dequeued, a dequeue processing engine may be selected among many dequeue processing engines for the packet that needs to be dequeued currently according to a preset rule. According to the preset rule, a dequeue processing engine may be selected at random, in turn or in any other preset modes.

In the process of sending the storage address of the packet to the dequeue processing engine, the storage address of the packet may include the storage address of the packet header and the storage address of the packet tail. The storage address of the packet may be obtained from the received dequeue command. In the process of sending the data amount of the packet to the dequeue processing engine allocated for the packet as the data amount to be dequeued, the storage address of the head packet in the queue may be sent to the dequeue processing engine allocated for the packet. The storage address of the head packet in the queue may be obtained from the received dequeue command. For example, for the head packet in the queue, the storage address may be carried in the dequeue command; for the packet which is not the head packet in the queue, the storage addresses of the packet may not be carried in the dequeue command. In this way, the dequeue processing engine may determine the storage addresses of the packet which is not the head packet in the queue according to the storage address of the head packet in the queue. Of course, for the packet which is not the head packet in the queue, the storage address of the packet may also be carried in the dequeue command (only the storage address of the packet header is needed). In this way, the dequeue processing engine may directly obtain the storage addresses of the packet and determine the storage locations of the packet.

The dequeue managing unit 204 is configured to: after the data amount of the packet allocated to the dequeue processing engine is subtracted from the dequeue data amount obtained from the dequeue command, and instruct the engine allocation processing unit 203 to continue to allocate a dequeue processing engine for a next packet that needs to be dequeued if the remainder is greater than zero, or stop instructing the engine allocation processing unit 203 to continue to allocate a dequeue processing engine for a next packet that is not dequeued if the remainder is smaller than or equal to zero.

In the dequeue process performed by the apparatus, the remainder obtained by the dequeue managing unit 204 may be smaller than zero. In this case, the apparatus may further include a dequeue data amount updating unit 205, which is configured to: when the remainder obtained by the dequeue managing unit 204 is smaller than zero, subtract the absolute value of the remainder from the new dequeue data amount carried in a new dequeue command, and use the new remainder as the updated dequeue data amount in the received dequeue command to update the dequeue data amount in the dequeue command received next time.

The apparatus may further include an engine releasing unit 206 configured to release the dequeue processing engine occupied by a packet or a queue after the multi-engine dequeue operating unit 202 dequeues the packet or the queue. If the multi-engine dequeue operating unit 202 dequeues multiple cells in a packet by using a dequeue processing engine allocated for the same packet, the engine releasing unit 206 may release the dequeue processing engine allocated for the packet after the dequeue operating unit dequeues all the cells in the packet so that other packets may occupy the dequeue processing engine.

In the preceding embodiments of apparatus, multiple dequeue processing engines concurrently dequeue multiple packets to be dequeued, and thus the data dequeue efficiency and performance are improved.

For better understanding of embodiments of the present invention, the following describes specific applications of the embodiments in detail based on the queue management of a multilevel linked list and with reference to the accompanying drawings.

Figure 3:
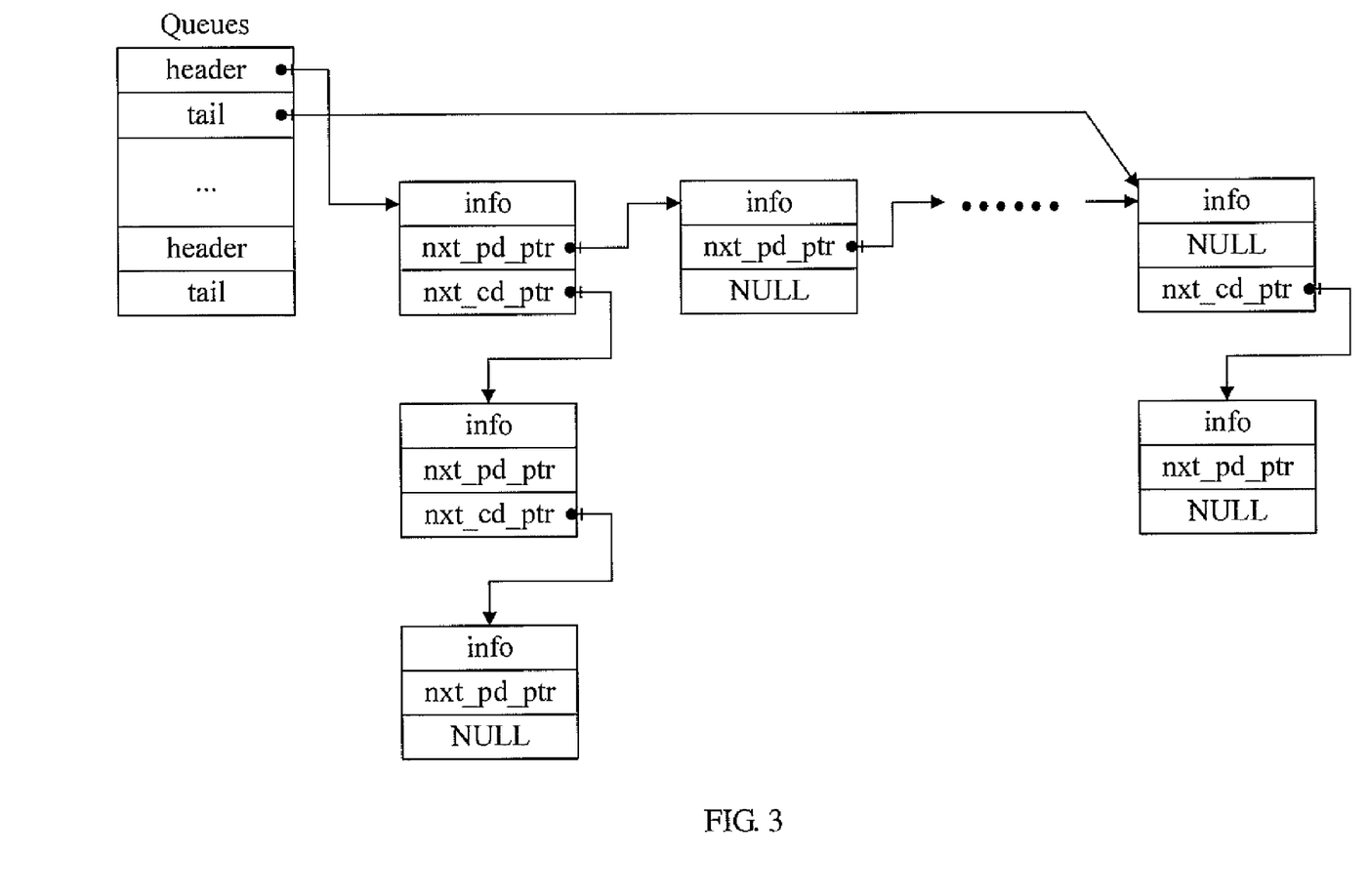
FIG. 3 shows a data structure of a multilevel linked list used in an embodiment of the present invention.

FIG. 3 shows a queue management structure of a multilevel linked list. As shown in FIG. 3, a level-1 linked list unit is called a packet descriptor (PD); a level-2 linked list unit is called a cell descriptor (CD). In a single-level linked list, only the PD is available, and the CD is unavailable. The queue data structure is represented by a header/tail pointer.

Figure 4:
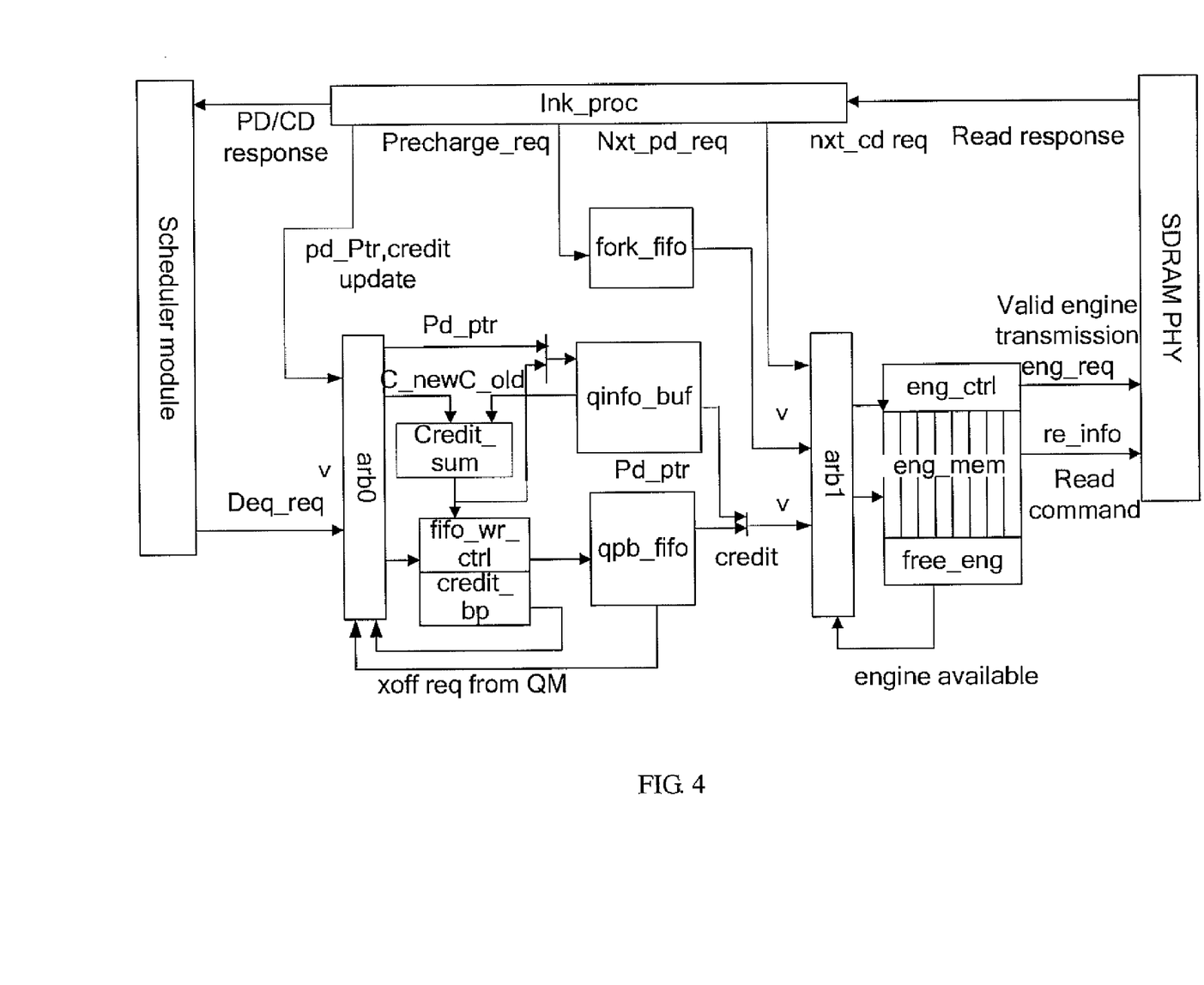
FIG. 4 is a third schematic diagram illustrating a structure of the apparatus in an embodiment of the present invention.

Based on the multilevel linked list queue, this embodiment provides a multi-engine apparatus for dequeuing packets in parallel. As shown in FIG. 4, in the apparatus, a dequeue command (or dequeue request) is received from the scheduler module; the packet (or data) to be dequeued that is managed by the multilevel linked list is stored in the SDRAM.

As shown in FIG. 4, the apparatus may include:

(1) An engine memory (eng_mem), an engine manager (free_eng), and an engine controller (eng_ctrl). The free_eng is responsible for managing multiple dequeue processing engines stored in the eng_mem and allocating engines for each packet to be dequeued to manage the applications of each engine, that is, it is configured to implement the function of the engine allocation processing unit 203 in the apparatus shown in FIG. 2B. The eng_ctrl implements the effective engine transmission (eng_req) and sends a command for reading the linked list data (that is, packets stored in linked list mode) to dequeue the linked list data, that is, it implements the function of the multi-engine dequeue operating unit 202.

The free_eng may also implement the function of the engine releasing unit 206 in the apparatus shown in FIG. 2B.

(2) An engine contention arbiter (arb1), a first queue waiting buffer (qinfo_buff), a second queue waiting buffer (qpb_fifo), and a derivative engine buffer (fork_fifo).

The arb1 is connected to the free_eng and is configured to: process the dequeue notifications sent from the qinfo_buff, the qpb_fifo, and the fork_fifo according to a preset priority (that is, the processing priority of each dequeue notification), and select engine for the dequeue notification. For example, the arb1 selects an engine for a high-priority dequeue notification first.

The dequeue notification sent from the fork_fifo is a dequeue notification for the next packet. The dequeue notification sent from the qinfo_buff and the qpb_fifo is a dequeue notification for a new dequeue command. In addition, the dequeue notification sent from the fork_fifo has a higher priority.

(3) A linked list processing module (lnk_proc) and a contention arbiter (arb0).

The lnk_proc is configured to implement the function of the dequeue managing unit 204 in the apparatus shown in FIG. 2B and the function of the dequeue data amount updating unit 205. The lnk_proc controls the multi-engine dequeue operating unit 202 to use a dequeue processing engine allocated for the same packet to dequeue multiple cells in the packet by sending a command to the arb1. Further, in the process of the controlling, after the sent command arrives at the arb1, the command has a higher priority than the dequeue notification that the fork_fifo sends to the arb1.

The arb0 is configured to process the information received from the lnk_proc and the dequeue command received from the scheduler module. The information from the lnk_proc has a higher priority than the dequeue command from the scheduler module. In FIG. 4, the xoff req from QM indicates that the qpb_fifo is full. Back pressure is performed on the arb0 so that the arb0 does not respond to the new dequeue request sent from the scheduler module. That is, to ensure that no overflow occurs, the back pressure needs to be performed on the new dequeue request sent from the scheduler module.

Based on the apparatus shown in FIG. 4, the process of executing the multi-engine parallel dequeue mechanism includes the following steps:

Step 1: Receiving a dequeue command deq_req (or dequeue request) that carries the total amount of the dequeue data (credit) from the scheduler module, and performing check in the priority arb0 at a low priority level. When no dequeue precharge request is available, that is, when no new dequeue command carrying the credit is sent, execute the following procedure:

(1) If the queue number is dequeued for the first time (that is, in the non-working state), combine the credit (c_new, indicating a new credit) carried in the dequeue command and the remaining credit (c_old, that is, the old credit, which may be greater than zero or smaller than or equal to zero) of the qinfo_buf into a Credit_sum.

If the credit which has been combined and added up is greater than zero, it indicates that it may contend for new dequeue engines. That is, the deq_req command may be set to enter the qbp_fifo, and the remaining credit (c_old) in the qinfo_buf is cleared to zero. In addition, the queue is marked with the dequeue state, that is, the working state. If the credit which has been combined and added up is smaller than or equal to zero, the credit which has been combined and added up is written to the qinfo buf and is processed when a subsequent dequeue precharge request is received.

(2) If the queue related to the queue number is already in the dequeue state (that is, the working state), combining the carried credit (c_new) and the remaining credit (c_old) of the qinfo_buf, and write the combined credit into the qinfo_buf through the fifo_wr_ctrl. Then, waiting for subsequent precharge operations.

Accordingly, the credit_bp shown in FIG. 3 is used for calculating the total credit of each queue waiting for dequeue engine allocation. To avoid the overflow, back pressure also needs to be performed on the new dequeue request sent from the scheduler module.

Step 2: Perform check for the deq_req command entering the qpb_fifo in the priority arb1 at the lowest priority level to contend for a dequeue engine.

Specifically, if neither the next PD request (nxt_pd_req) of the fork_fifo nor the next CD request (nxt_cd_req) sent from the lnk_proc is available in the priority arb1, the deq_req command of the qpb_fifo may obtain a dequeue engine when the free_eng has idle engines so that the dequeue engine may perform subsequent dequeue operations.

Step 3: Recording the dequeue information carried in the dequeue command for obtaining the dequeue engine in the eng_mem, and select a valid engine among the dequeue engines as the dequeue engine of the dequeue command according to the dequeue command validity rule, and, sending a read command to the off-chip SRAM.

The dequeue command validity rule is used for checking the compliance with valid dequeue conditions. For example, the lower-level back pressure may be checked; the queue data can be dequeued when the dequeue command of a queue is valid, wherein the dequeue command of a queue is not back pressured by lower-level.

Step 4: After several clock cycles, the SRAM returns the read data (that is, the address information of the PD linked list unit or the CD linked list unit) of the lnk_proc. The lnk_proc processes the linked list unit data which has been read.

The processing operations may include integrity check (for example, ECC), and retrieval of nxt_cd_ptr and nxt_pd_ptr.

For the correct PD data or CD data, the lnk_proc returns it to the scheduler module that sends the dequeue command initially as the PD response or CD response. In addition, the lnk_proc needs to traverse subsequent linked list units of the linked list to dequeue subsequent packets. The details are as follows:

1. The following processing methods may be used when the nxt_cd_ptr is valid (!=NULL) or when the nxt_cd_ptr is invalid (==NULL).

When the nxt_cd_ptr is valid, each cell in a packet that is being dequeued is not dequeued completely, and a nxt_cd_req is generated. The generated nxt_cd_req is used as a command with the highest priority that has the rights to update the engine memory (eng_mem) in the priority arb1 so that the old dequeue engine accesses the next CD data of the packet by using a new CD address. The process goes to step 5.

If the nxt_cd_ptr is invalid, each cell in the packet that is being dequeued has been dequeued. In this case, the free_eng releases the occupied dequeue engine resource so that other packets may be dequeued by the dequeue engine.

2. In the lnk_proc, if an engine is already allocated, the packet length in the PD is subtracted from the current credit carried in the dequeue engine, wherein an engine has already been allocated to the PD. Different processes are implemented according to whether the remaining credit is greater than zero.

(1) If the remaining credit is greater than zero, the dequeue operation is not completed, which may be represented by nxt_pd_ptr!=NULL. In this case, the next packet may be dequeued by using the nxt_pd_ptr as the address of the next PD in combination with the remaining credit. The information such as the remaining credit and the nxt_pd_req may be buffered in the fork_fifo. The depth of the fork_fifo may be equal to the number of engines of the system. The nxt_pd_req output by the fork_fifo contends for an engine by using the second priority (only lower than the priority of the nxt_cd_req sent from the lnk_proc) in the priority arb1. After the engine is allocated successfully, the next packet is dequeued until the remaining credit is used up or nxt_pd_ptr==NULL (invalid). The process goes to the following step (2). Thus, it is guaranteed that the credit sent first can obtain a dequeue engine faster and that the dequeue operation is completed immediately.

(2) If the remaining credit is equal to zero or smaller than zero (that is, in the deficit state):

If the nxt_pd_ptr is valid, the data in the queue has not been dequeued completely. In this case, the precharge_req may be sent to the priority arb0 at a high priority to obtain the rights to access the qinfo_buff and store the current remaining credit information and the nxt_pd_ptr in the qinfo_buff to wait for subsequent precharge operations. Then, a new dequeue command is received and a new credit is obtained. When the credit is greater than zero, each queue enters the qpb_fifo again to contend for an engine for dequeuing.

If the nxt_pd_ptr is invalid and a new PD pointer is reobtained from the dequeue command (that is, a valid nxt_pd_ptr is obtained), each queue enters the qpb_fifo again to contend for a dequeue engine.

Step 5: If the nxt_cd_ptr is valid (!=NULL) in step 4, generating a nxt_cd_req for dequeuing the next CD, and sending the nxt_cd_req to the priority arb1. The priority arb1 regards the nxt_cd_req as the highest priority and dequeues the next CD by using an engine related to the packet. In this way, the PD and CD linked list units can be dequeued at the fastest pace for a packet that has obtained the dequeue engine in the queue. Thus, it is ensured that the CD linked list units can be dequeued at the fastest pace for the packet that has obtained the dequeue engine first.

In the preceding process, the eng_mem may be but is not limited to a register. In the dequeue process, only few engines (for example, four to eight engines) need to be used for dequeuing multiple queues, thus making up for the gap caused by the SSRAM access delay. In addition, the eng_mem may be a register array (RA) designed with the structure of a universal application specific integrated circuit (ASIC) or a distributed RAM designed with the structure of a field programmable gate array (FPGA), which may save resources.

Further, in the preceding system where queues are processed by hardware logic, only the multilevel linked list data management method is described as an example. This embodiment may also be used for dequeuing data in a single-level linked list data structure or other data structures managed by other methods, for example, the data structure managed by the traverse method.

In conclusion, in embodiments of the present invention, the concept of multi-engine parallel processing is introduced. Which may overcome the waste of bandwidths due to the delays of multiple cycles during the access of an off-chip SSRAM in the procedure of single processing of dequeuing in the prior art.

In the preceding solution, by using the priority arb0 and the priority arb1 that feature a fixed priority, it is guaranteed that the dequeue operation can be performed first for a command received first. Thus, when the previous level scheduler is available, it can be guaranteed that multiple engines provide fair services for a large number of queues.

Embodiments of the present invention can be used not only in data structures in the form of a single-level linked list or a multilevel linked list, but also in the graph traversal process. The specific process is similar to the preceding process, and is not further described.

It is understandable to those skilled in the art that all or part of the steps of the method may be implemented by a digital logic hardware circuit. The digital logic hardware circuit may be an ASIC or an FPGA. During the working of the circuit, the processes of the preceding methods may be involved.

It is understandable to those skilled in the art that all or part of the processes in the preceding method may be completed by hardware instructed by a computer program. The program may be stored in a computer readable storage medium. During the execution of the program, the processes of the preceding embodiments may be involved. The storage medium may be a magnetic disk, a compact disk read-only memory (CD-ROM), a read-only memory (ROM) or a random access memory (RAM).

Although the present invention has been described through several exemplary embodiments and accompanying drawings, the present invention is not limited to those embodiments. It is apparent that those skilled in the art can make various modifications and variations to the invention without departing from the spirit and scope of the invention. The invention shall cover the modifications and variations provided that they fall within the scope of protection defined by the following claims or their equivalents.

What is claimed is:

1. A method for dequeuing data, the method comprising:
receiving a dequeue command;
obtaining from the dequeue command storage addresses of packets in each queue and information about dequeue data amount;
allocating a dequeue processing engine in multiple dequeue processing engines for a packet in each queue that needs to be dequeued currently, and sending data amount of the packet to the dequeue processing engine as data amount to be dequeued; subtracting the data amount of the packet from the dequeue data amount to generate a remainder; if the remainder is greater than zero, allocating the dequeue processing engine for a next packet in the each queue that needs to be dequeued until the remainder is smaller than or equal to zero; and
dequeuing, by the multiple dequeue processing engines, the packets in each queue in parallel according to the storage addresses of the packets in each queue.

2. The method according to claim 1, further comprising:
if the remainder is smaller than zero, subtracting an absolute value of the remainder from new dequeue data amount carried in a newly received dequeue command until a new remainder of subtraction is greater than zero, and using the new remainder as an updated dequeue data amount in the newly received dequeue command.

3. The method according to claim 1, further comprising:
by a priority arbiter, ensuring that dequeue data amount in each queue that needs to be dequeued in a currently received dequeue command is allocated to a related dequeue processing engine first; and
ensuring that the packet which a dequeue processing engine has been allocated to is dequeued first by the dequeue processing engine.

4. The method according to claim 1, further comprising:
after dequeuing a packet or a queue, releasing the dequeue processing engine occupied by the packet or the queue.

5. The method according to claim 1, wherein the step of dequeuing the packets in each queue comprises:
dequeuing, by a dequeue processing engine allocated for the same packet, multiple cells in the packet; and releasing the dequeue processing engine after all the cells in the packet are dequeued.

6. An apparatus for dequeuing data, comprising:
an information obtaining unit, configured to receive a dequeue command and obtain from the dequeue command storage addresses of packets in each queue and information about dequeue data amount;

an engine allocation processing unit, configured to: allocate a dequeue processing engine in multiple dequeue processing engines for a packet in the each queue that needs to be dequeued currently, and send data amount of the packet to the dequeue processing engine as the data amount to be dequeued;

a dequeue managing unit, configured to: subtract the data amount of the packet from the dequeue data amount to generate a remainder, if the remainder is greater than zero, instruct the engine allocation processing unit to continue to allocate the dequeue processing engine for a next packet in the each queue that needs to be dequeued until the remainder is smaller than or equal to zero; and a multi-engine dequeue operating unit, configured to dequeue the packets in each queue in parallel by the multiple dequeue processing engines according to the storage addresses of the packets in each queue obtained by the information obtaining unit.

7. The apparatus according to claim 6, further comprising:

a dequeue data amount updating unit, configured to: when the remainder obtained by the dequeue managing unit is smaller than zero, subtract an absolute value of the remainder from new dequeue data amount carried in a newly received dequeue command until a new remainder of subtraction is greater than zero, and use the new remainder as an updated dequeue data amount in the newly received dequeue command.

8. The apparatus according to claim 6, further comprising:

a first priority arbiter, configured to ensure that dequeue data amount in each queue that needs to be dequeued in a currently received dequeue command is allocated to a related dequeue processing engine first; and a second priority arbiter, configured to ensure that the packet which a dequeue processing engine is allocated to is dequeued first by the dequeue processing engine.

9. The apparatus according to claim 6, further comprising an engine releasing unit configured to release the dequeue processing engine occupied by the packet or queue after the dequeue operating unit dequeues a packet or a queue.

10. The apparatus according to claim 9, wherein the multi-engine dequeue operating unit is further configured to dequeue multiple cells in a packet by using a dequeue processing engine allocated for the same packet and the engine releasing unit is further configured to release the dequeue processing engine allocated for the packet after the dequeue operating unit dequeues all the cells.

11. A computer readable media, comprising logic encoded in the computer readable media, the logic when executed by a processor, instructing the processor to:

receive a dequeue command and obtain storage from the dequeue command addresses of packets in each queue and information about dequeue data amount;

allocate a dequeue processing engine in multiple dequeue processing engines for a packet in the each queue that needs to be dequeued currently, send data amount of the packet to the dequeue processing engine as data amount to be dequeued; subtract the data amount of the packet from the dequeue data amount to generate a remainder; if the remainder is greater than zero, allocate the dequeue processing engine for a next packet in the each queue that needs to be dequeued until the remainder is smaller than or equal to zero; and dequeue, by the multiple dequeue processing engines, the packets in each queue in parallel according to the storage addresses of the packets in each queue.

12. The computer readable media according to claim 11, wherein the processor is further instructed to:

if the remainder is smaller than zero, subtract an absolute value of the remainder from new dequeue data amount carried in a newly received dequeue command until a new remainder of subtraction is greater than zero, and use the new remainder as an updated dequeue data amount in the newly received dequeue command.

13. The computer readable media according to claim 11, wherein the processor is further instructed to:

by a priority arbiter, ensure that dequeue data amount in each queue that needs to be dequeued in a currently received dequeue command is allocated to a related dequeue processing engine first; and ensure that the packet which a dequeue processing engine has been allocated to is dequeued first by the dequeue processing engine.

14. The computer readable media according to claim 11, wherein the processor is further instructed to:

after dequeuing a packet or a queue, release the dequeue processing engine occupied by the packet or the queue.

15. The computer readable media according to claim 11, wherein the step of dequeuing the packets in each queue comprises:

dequeuing, by a dequeue processing engine allocated for the same packet, multiple cells in the packet; and releasing the dequeue processing engine after all the cells in the packet are dequeued.

* * * * *